US011940016B2

United States Patent
Amaro et al.

(10) Patent No.: US 11,940,016 B2
(45) Date of Patent: Mar. 26, 2024

(54) CLUTCH RELEASE BEARING INCLUDING INSERTS

(71) Applicant: SCHAEFFLER TECHNOLOGIES AG & CO. KG, Herzogenaurach (DE)

(72) Inventors: Milton Amaro, Sorocaba (BR); Alessandro Aparecido Ferreira, Votorantim (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 51 days.

(21) Appl. No.: 17/748,332

(22) Filed: May 19, 2022

(65) Prior Publication Data

US 2023/0375048 A1 Nov. 23, 2023

(51) Int. Cl.
*F16D 23/14* (2006.01)
(52) U.S. Cl.
CPC .................. *F16D 23/143* (2013.01)
(58) Field of Classification Search
CPC ...... F16D 23/14; F16D 23/141; F16D 23/143; F16D 23/148
See application file for complete search history.

(56) References Cited

U.S. PATENT DOCUMENTS

| 4,926,993 | A | * | 5/1990 | Kusumoto | F16D 23/14 192/110 B |
| 5,156,248 | A | * | 10/1992 | Caron | F16D 23/14 384/612 |
| 2002/0139633 | A1 | * | 10/2002 | Cole | F16D 23/14 192/110 B |
| 2003/0205441 | A1 | * | 11/2003 | Morford | F16D 23/12 192/99 S |

FOREIGN PATENT DOCUMENTS

| DE | 102015209931 A1 * | 12/2016 | |
| EP | 1498630 A1 * | 1/2005 | ............. F16D 23/14 |

* cited by examiner

*Primary Examiner* — Lori Wu
(74) *Attorney, Agent, or Firm* — Volpe Koenig

(57) ABSTRACT

A clutch release bearing assembly is disclosed herein that includes a more durable and improved interface for engaging an actuator. The assembly includes a housing having at least one flange, and the housing is formed from a first material. At least one insert is supported on the at least one flange, and the at least one insert is configured to engage an actuator. The at least one insert is formed from a second material that is different than the first material.

18 Claims, 3 Drawing Sheets

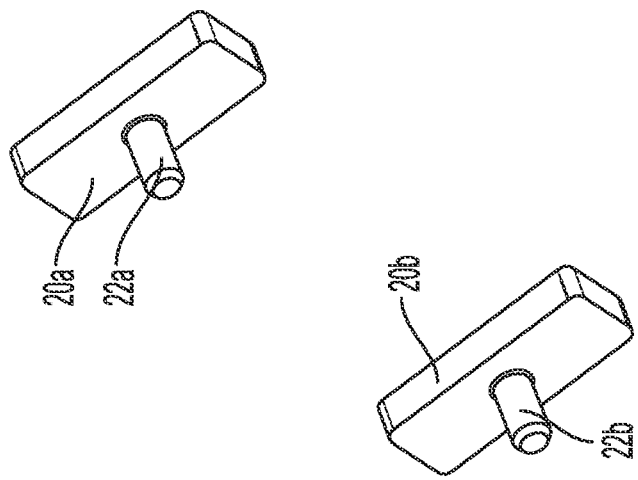
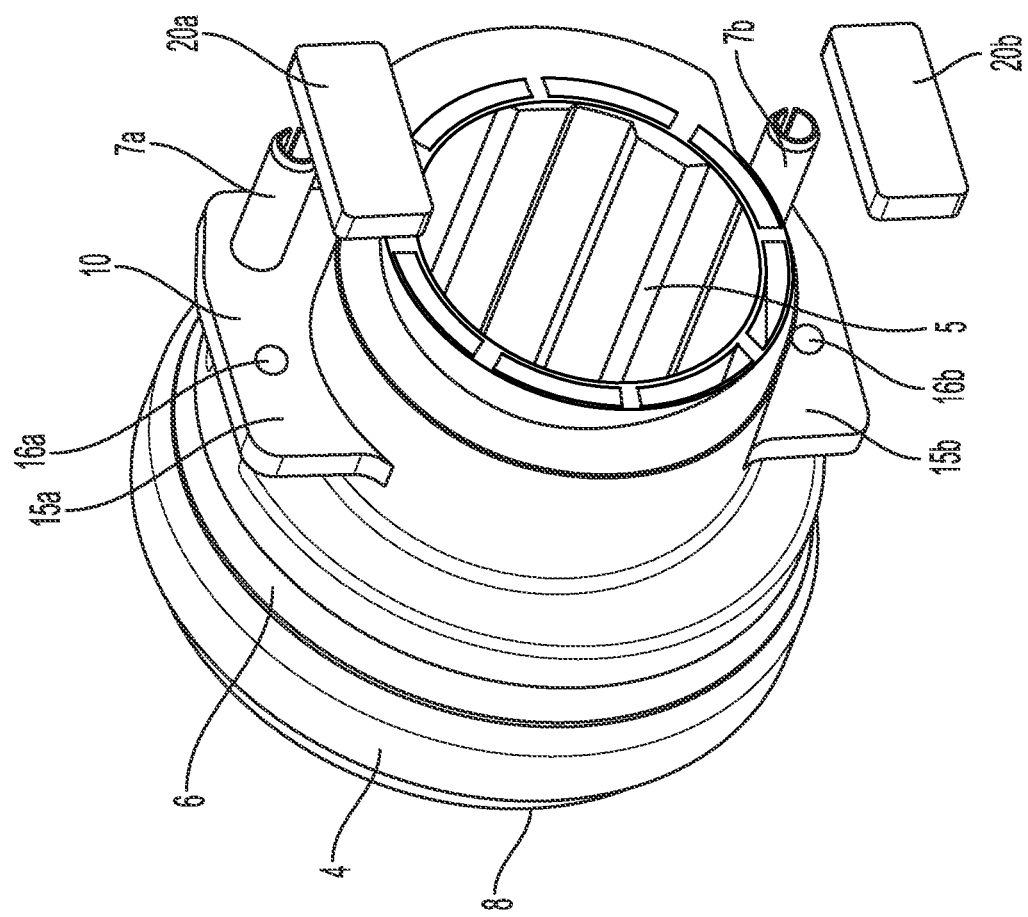

CLUTCH RELEASE BEARING INCLUDING INSERTS

FIELD OF INVENTION

The present disclosure relates to a clutch release bearing.

BACKGROUND

Clutch release bearings are used in a wide range of applications. The types of housing used in these applications generally must be durable to withstand actuation forces, which can be applied by a variety of actuators, such as a fork load actuator. Specifically, the actuation region on a housing in these applications must be configured to withstand engagement without experiencing premature wear.

One known solution for ensuring that the housing can withstand actuation forces is to form the entire housing from cast iron, or some other durable material. However, this has drawbacks because once the actuation region of the housing wears down, then the entire housing must be replaced. Additionally, it is expensive and labor intensive to heat treat the entire housing such that it is sufficiently durable for the engagement with the actuator.

It would be desirable to provide a more suitable arrangement that provides a durable actuation or engagement portion, while also cost-effective.

SUMMARY

A clutch release bearing assembly is disclosed herein that includes a more durable and improved interface for engaging an actuator. The assembly includes a housing having at least one flange, and the housing is formed from a first material. At least one insert is supported on the flange, and the insert is configured to engage an actuator. The insert is formed from a second material that is different than the first material. The insert can be selectively attached or connected to the flange such that the insert can be replaced in the event of significant wear.

The flange includes a first mating element and the insert includes a second mating element. The first mating element and the second mating element are configured to engage with each other to connect or join the insert with the flange.

The first mating element can be formed as a hole, passage or other opening on the flange, and the second mating element can be a protrusion extending axially from the insert. The opening and the protrusion can be fastened to each other via a positive fit connection. Manufacturers or other personnel can press the first mating element and the second mating element together to fasten the insert with the flange.

The flange can include a first flange and a second flange, and the insert can include a first insert and a second insert. One of ordinary skill in the art would understand that the quantity and geometry of these components can vary depending on the specific requirements of a system.

In one embodiment, the housing is formed from gray iron. One of ordinary skill in the art would understand that other types of casting irons can also be used. The insert can be formed from spheroidal graphite cast iron, carbon steel, or alloy steel. The insert can be heat treated.

The flange of the housing can also be configured to support an anti-rotation element.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 2 is a perspective view of a sub-set of components of the clutch bearing assembly of FIG. 1 in a partially assembled state.

FIG. 3 is a perspective view of two inserts for the clutch bearing assembly.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
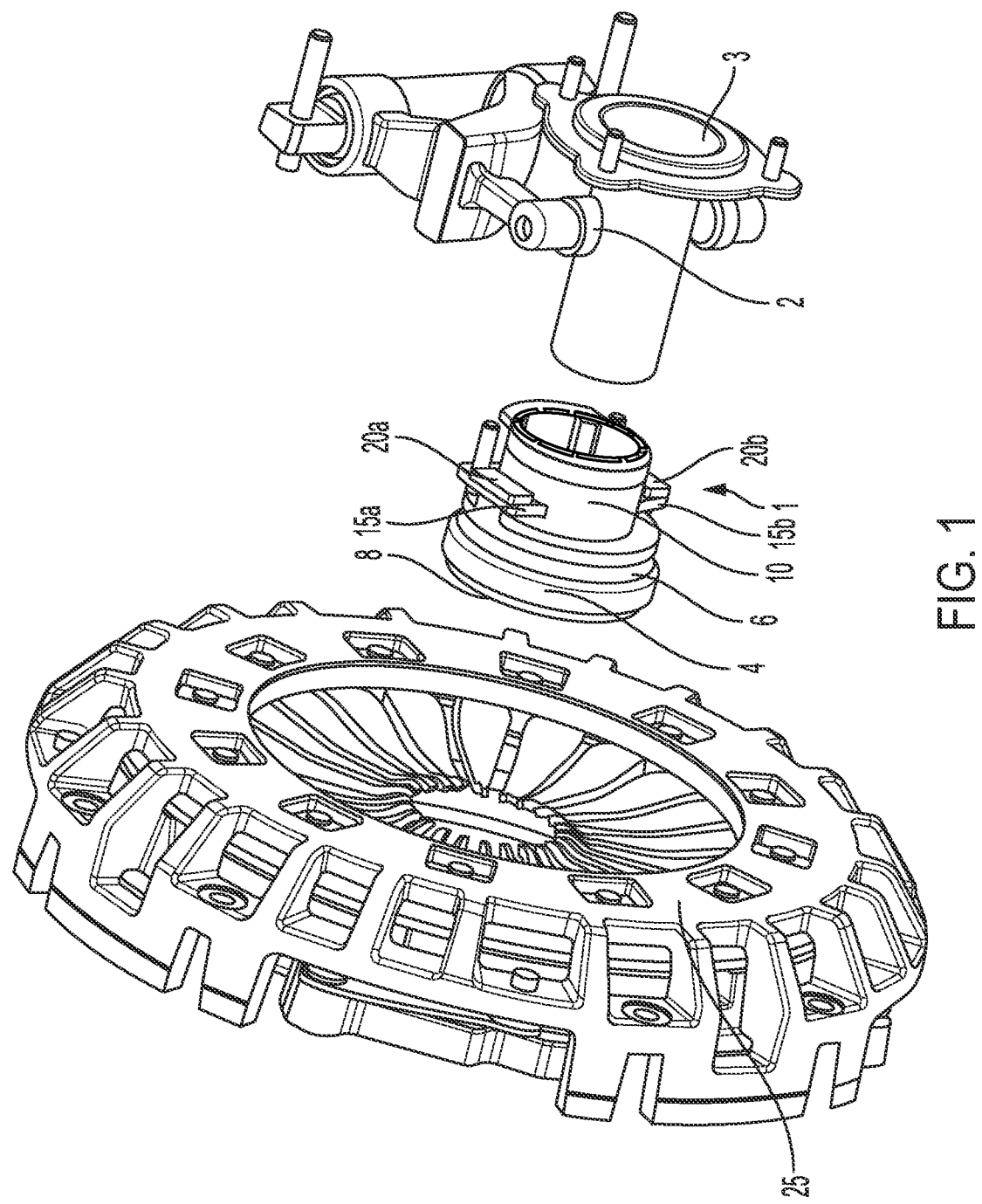
FIG. 1 is a perspective view of a clutch bearing assembly.
Figure 4:
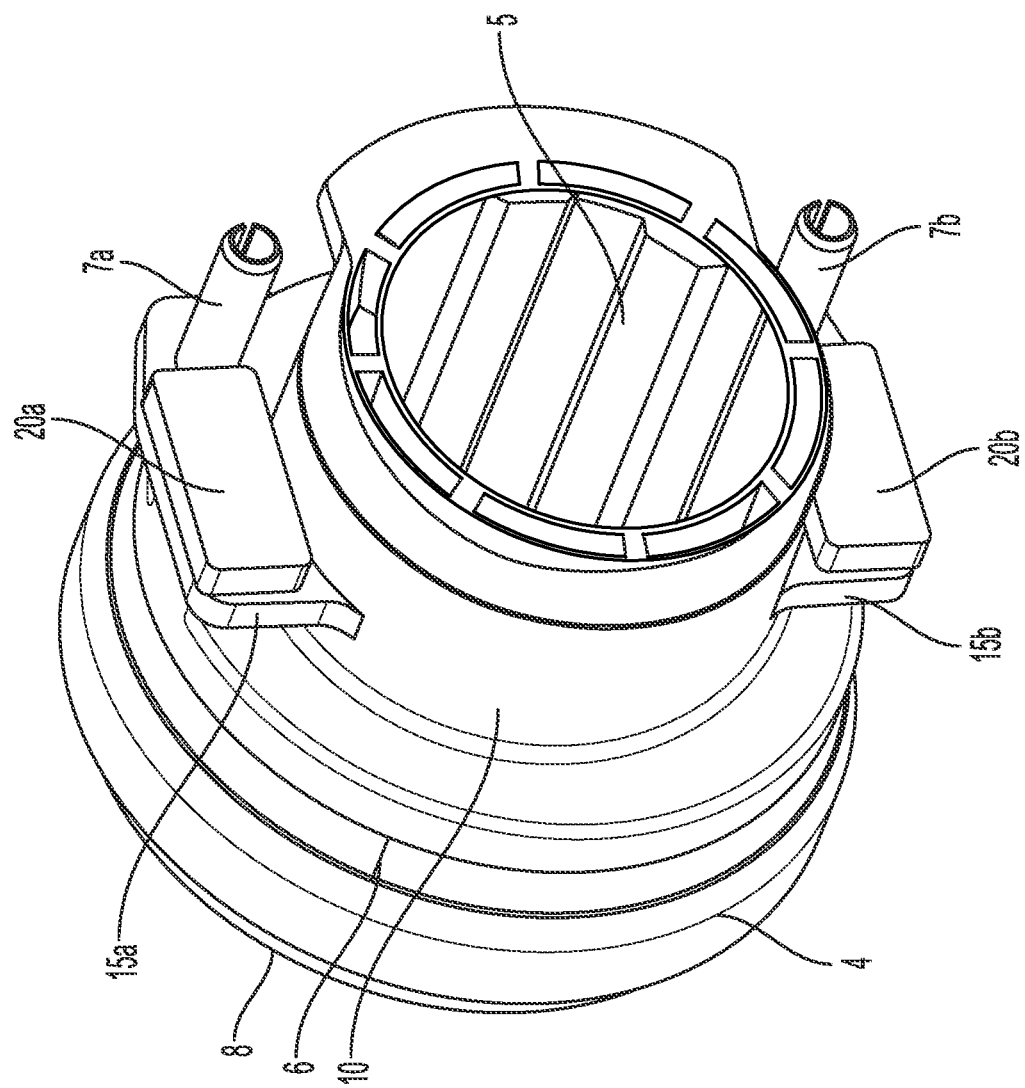
FIG. 4 is another perspective view of the sub-set of clutch bearing assembly components of the clutch bearing assembly of FIG. 1 in an assembled state.

As shown in FIG. 1, a clutch release bearing assembly 1 is disclosed herein. The clutch release bearing assembly 1 can generally include a housing 10, which is described in further detail herein, as well as a sealing cap 4, an outer ring 6 and an inner ring 8. The actuator 2 used in the system can be a fork or a lever actuator, in one embodiment. The actuator 2 is configured to be selectively engaged to the clutch pedal actuator. During the application, when the driver presses the clutch pedal, the clutch pedal actuator triggers the fork (i.e. actuator 2) to press the clutch release bearing through the insert, to open the clutch 25 during gear change. A guiding sleeve 3 can be provided on which the clutch release bearing slides during application.

The housing 10 can include at least one flange 15a, 15b extending radially away from a main body portion. The housing 10 can be formed from a first material. In one embodiment, the housing 10 is formed from gray iron. In one embodiment, the housing 10 can be formed from lamellar graphite cast iron—GG25 or other types of casting grey irons.

The at least one flange 15a, 15b can include two flanges 15a, 15b that can extend diametrically opposed from each other. One of ordinary skill in the art would understand that the exact configuration of the flanges 15a, 15b can vary.

At least one insert 20a, 20b is also provided that is configured to be supported on the flange 15a, 15b of the housing 10. The insert 20a, 20b can be configured to engage an actuator, such as the actuator 2. The insert 20a, 20b can be formed from a second material that is different than the first material of the housing 10. The insert 20a, 20b is configured to be formed completely separate from the housing 10, from a separate material and via separate treatment steps, such as heat treatment. In one specific embodiment, the insert 20a, 20b can be formed from spheroidal graphite cast iron. In one embodiment, the insert 20a, 20b can be formed from spheroidal graphite cast iron (such as GGG60, GGG70, etc.), carbon steel, such as SAE 1045, SAE 1080 or other types of carbon steel, as well as alloy steel, such as SAE 52100. The insert 20a, 20b can be heat treated. The inserts 20a, 20b can undergo heat treatment that includes full quenching. The specific selection of different materials for the housing 10 as compared to the insert 20a, 20b allows for one portion of the sub-combination of the housing 10 and the insert 20a, 20b to be more suitable or durable for enduring wear from the actuator 2.

The housing 10 is generally configured to be joined with the insert 20a, 20b. The flange 15a, 15b can include a first mating element 16a, 16b and the insert 20a, 20b can include a second mating element 22a, 22b. In one embodiment, the first mating element 16a, 16b can be formed as an opening or through hole on the flange 15a, 15b. In one embodiment, the second mating element 22a, 22b can be formed as a protrusion from the insert 20a, 20b. The first mating element 16a, 16b and the second mating element 22a, 22b are configured to engage with each other to connect or attach the insert 20a, 20b with the flange 15a, 15b. The protrusion formed as the second mating element 22a, 22b can extend in axial direction. One of ordinary skill in the art would understand that the flange 15a, 15b can instead include a male mating element and the insert 20a, 20b can include a female mating element.

Various types of connections can be provided between the first mating element 16a, 16b and the second mating element 22a, 22b. For example, the first mating element 16a, 16b and the second mating element 22a, 22b can be fastened to each other via a positive fit connection (such as a press fit). Additional fixation steps or features can be used, such as welding, gluing or adhesive, etc.

In one embodiment, the insert 20a, 20b can be configured to be selectively removed from the flange 15a, 15b. One of ordinary skill in the art would recognize that these removal methods will vary depending on the attachment or connection method.

The flange 15a, 15b of the housing 10 can also be configured to support an anti-rotation element 7a, 7b. For example, the anti-rotation element 7a, 7b can be formed as an elastic pin that is configured to be attached to the flange 15a, 15b. The function of the anti-rotation element 7a, 7b is to avoid the relative spin of the bearing thereby losing the correct position.

In one embodiment, the at least one flange 15a, 15b has a first thickness and the at least one insert 20a, 20b has a second thickness. In one aspect, the first thickness of the flange 15a, 15b can be 4.0 mm-15.0 mm. In one aspect, the second thickness of the insert 20a, 20b can be 2.0 mm-10.0 mm. In one embodiment, the second thickness is 50%-70% of the first thickness. In another embodiment, the first and second thickness can be equal to each other. One of ordinary skill in the art would understand that these thicknesses can vary depending on the particular requirements for a specific application.

A method of producing or assembling a clutch release bearing assembly 1 is also provided herein. The method can include forming a housing 10 from a first material, and the housing 10 includes at least one flange 15a, 15b. The method can include forming at least one insert 20a, 20b from a second material that is different than the first material. The method can include connecting the at least one insert 20a, 20b with the at least one flange 15a, 15b. This connection can be achieved via a variety of configurations.

The method can also include connecting an anti-rotation element 7a, 7b to the at least one flange 15a, 15b.

The method can also include subsequently removing the insert 20a, 20b from the flange 15a, 15b after a predetermined period of use, and connecting at least one replacement insert 20a, 20b to the flange 15a, 15b to replace the original insert 20a, 20b. For example, in one configuration, a reduction in the thickness of the inserts 20a, 20b of approximately 0.5 mm-1.0 mm can be indicative that the inserts 20a, 20b must be replaced.

In one aspect, this configuration of being able to re-use the housing 10 reduces the environmental impact by reducing the amount of material that must be scrapped or discarded by only replacing the inserts 20a, 20b as opposed to the entire housing 10.

The method can also include engaging the insert 20a, 20b with an actuator 2.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Clutch release bearing assembly 1
Actuator 2
Guiding sleeve 3
Sealing cap 4
Bushing 5
Outer ring 6
Pin 7a, 7b
Inner ring 8
Housing 10
Flange 15a, 15b
First mating element 16a, 16b
Insert 20a, 20b
Second mating element 22a, 22b
Clutch 25

What is claimed is:

1. A clutch release bearing assembly comprising:
   a housing including at least one flange, the housing being formed from a first material; and
   at least one insert supported on the at least one flange, wherein the at least one insert is configured to engage an actuator, and the at least one insert is formed from a second material that is different than the first material;
   wherein the at least one flange includes a first mating element and the at least one insert includes a second mating element, wherein the first mating element and the second mating element are configured to engage with each other to connect the at least one insert with the at least one flange;
   wherein the insert and the second mating element are integrally formed.

2. The assembly according to claim 1, wherein the first mating element is an opening formed on the at least one flange, and the second mating element is a protrusion extending axially from the at least one insert.

3. The assembly according to claim 2, wherein the opening and the protrusion are fastened to each other via a positive fit connection.

4. The assembly according to claim 2, wherein the at least one insert is configured to be selectively removed from the at least one flange.

5. The assembly according to claim 1, wherein the at least one flange includes a first flange and a second flange and the at least one insert includes a first insert and a second insert.

6. The assembly according to claim 1, wherein the housing is formed from gray iron.

7. The assembly according to claim 1, wherein the at least one insert is formed from spheroidal graphite cast iron, carbon steel, or alloy steel.

8. The assembly according to claim 1, wherein the at least one insert is heat treated.

9. The assembly according to claim 1, wherein the at least one flange of the housing is configured to support an anti-rotation element.

10. The assembly according to claim 1, wherein the at least one flange has a first thickness and the at least one insert has a second thickness, and the second thickness is 50%-70% of the first thickness.

11. A method of producing a clutch release bearing assembly, the method comprising:
    forming a housing from a first material, the housing including at least one flange, and forming at least one insert from a second material that is different than the first material; and
    connecting the at least one insert with the at least one flange;
    wherein the at least one flange includes a first mating element and the at least one insert includes a second mating element, wherein the first mating element and the second mating element are configured to engage with each other to connect the at least one insert with the at least one flange, and wherein the insert and the second mating element are integrally formed.

12. The method according to claim 11, wherein the housing is formed from gray iron.

13. The method according to claim 11, wherein the at least one insert is formed from spheroidal graphite cast iron, carbon steel, or alloy steel.

14. The method according to claim 11, further comprising heat treating the at least one insert.

15. The method according to claim 11, further comprising connecting an anti-rotation element to the at least one flange.

16. The method according to claim 11, further comprising removing the at least one insert from the at least one flange after a predetermined period of use, and connecting at least one replacement insert to the at least one flange to replace the at least one insert.

17. The method according to claim 11, wherein the at least one flange has a first thickness and the at least one insert has a second thickness, and the second thickness is 50%-70% of the first thickness.

18. The method according to claim 11, further comprising engaging the at least one insert with a fork actuator.

* * * * *